United States Patent [19]

Jones et al.

[11] Patent Number: 4,752,779
[45] Date of Patent: Jun. 21, 1988

[54] TRACKING RADAR SYSTEMS

[75] Inventors: Michael A. Jones, Edgware; Richard H. Campbell, Hemel Hempstead; Christopher D. Huggett, St Albans; Anthony J. Benson, Grays; John A. Gurr, St Albans, all of England

[73] Assignee: The Marconi Company Limited, England

[21] Appl. No.: 864,451

[22] Filed: Dec. 20, 1977

[30] Foreign Application Priority Data

Dec. 20, 1976 [GB] United Kingdom ............... 53101/76
Dec. 20, 1976 [GB] United Kingdom ............... 53102/76
Dec. 20, 1976 [GB] United Kingdom ............... 53103/76

[51] Int. Cl.$^4$ ............................................ G01S 13/68
[52] U.S. Cl. ........................................ 342/80; 342/62; 342/149
[58] Field of Search ................ 343/7.4, 16 M; 342/80, 342/149, 62

[56] References Cited

U.S. PATENT DOCUMENTS

| | | | |
|---|---|---|---|
| 3,949,955 | 4/1976 | Sykes et al. | 342/62 X |
| 4,010,467 | 1/1977 | Slivka | 342/62 X |
| 4,148,029 | 4/1979 | Quesinberry | 342/67 X |
| 4,194,204 | 3/1980 | Alpers | 342/80 |
| 4,204,210 | 5/1980 | Hose | 342/62 X |

Primary Examiner—T. H. Tubbesing
Attorney, Agent, or Firm—Kirschstein, Kirschstein, Ottinger & Israel

[57] ABSTRACT

A missile guidance system having means for deriving from a target angle tracking loop a signal indicative of an apparent movement of a target off a missile-to-target sight line caused by a change in missile attitude, and means for feeding said apparent movement signal into a space stabilization loop to adjust the position of the aerial to compensate for said apparent movement.

4 Claims, 7 Drawing Sheets

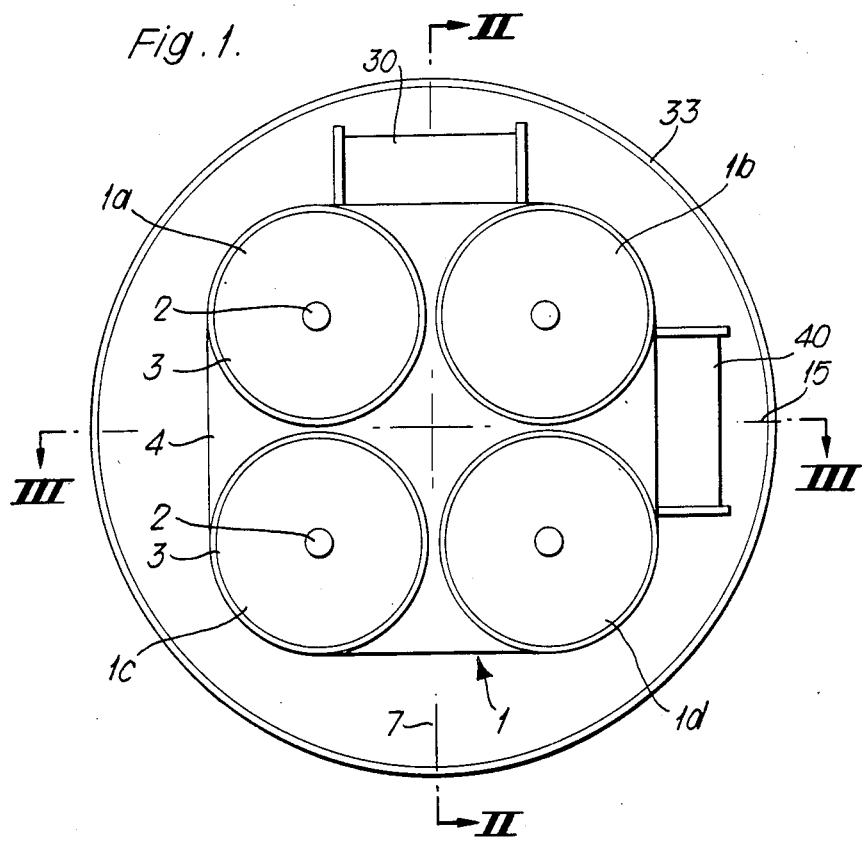
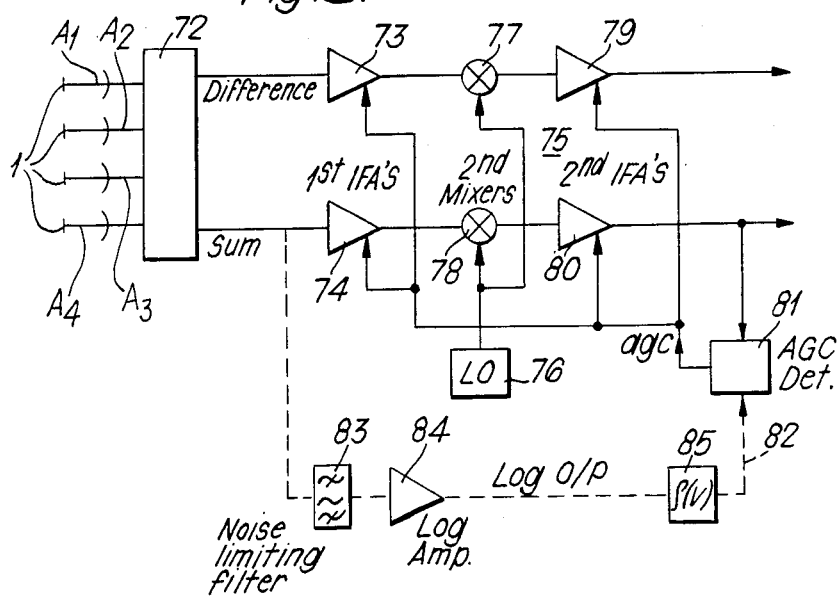

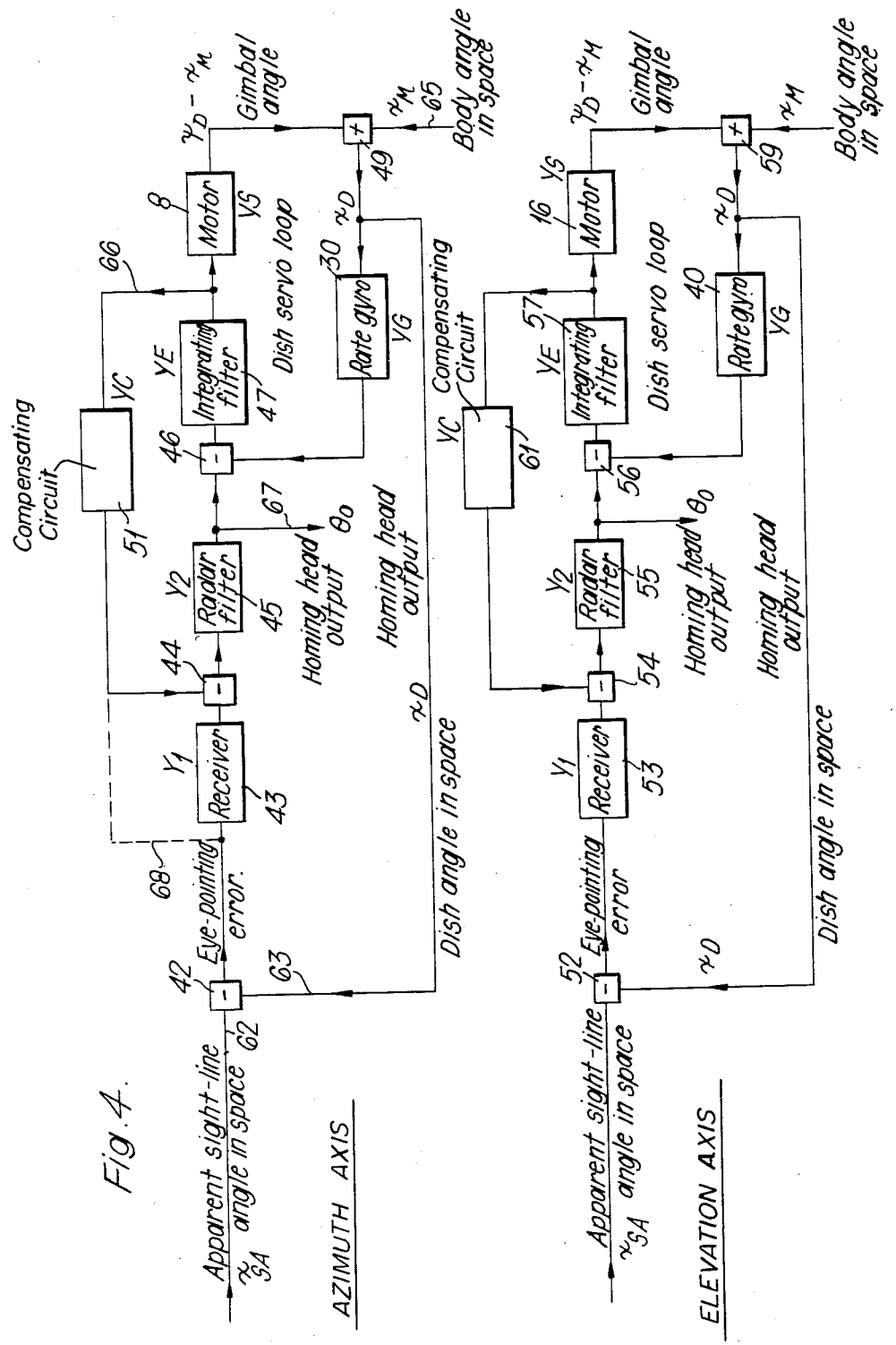

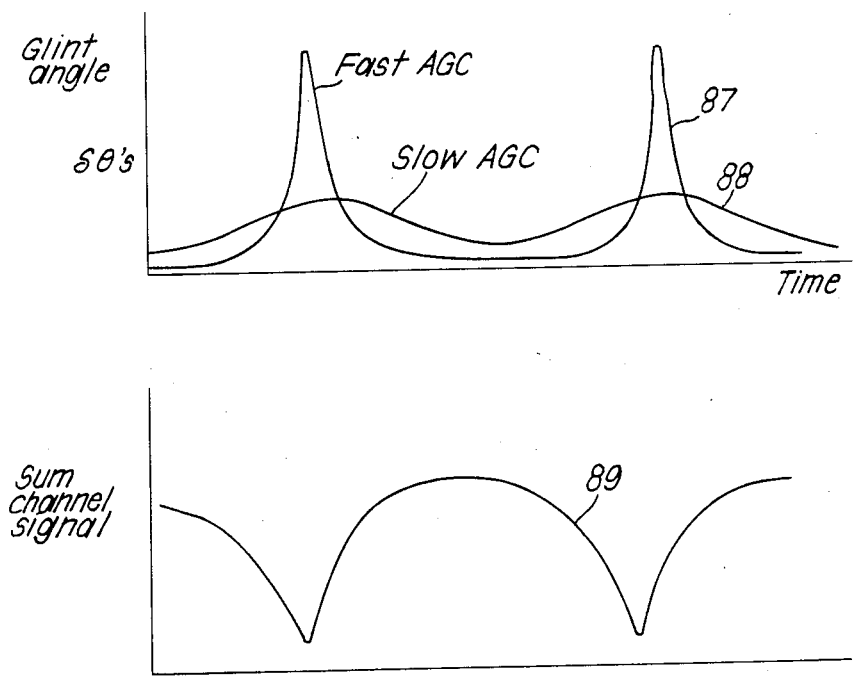

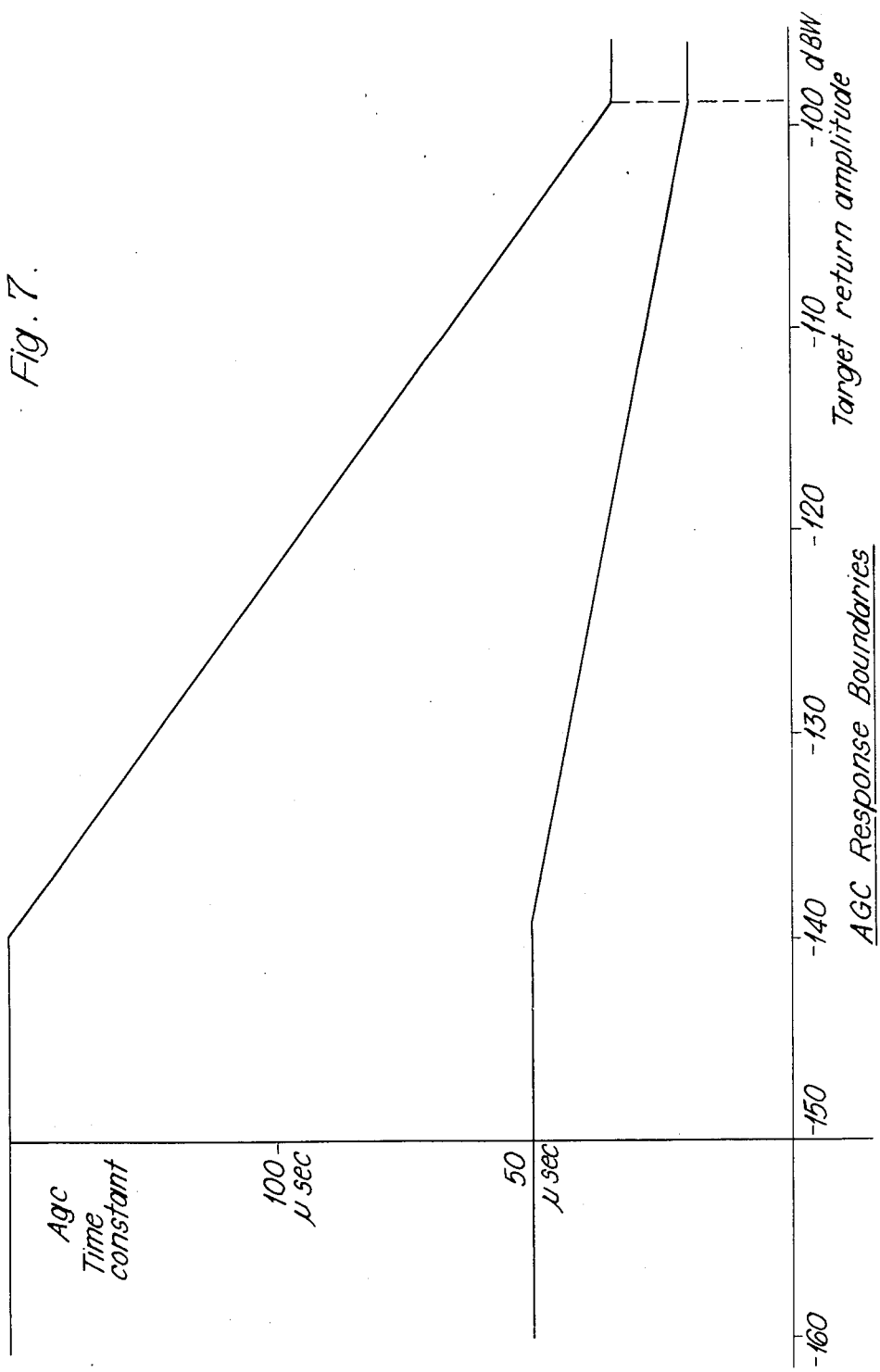

TRACKING RADAR SYSTEMS

This invention relates to radar tracking systems and has an important application to radar tracking systems for use in guided missiles.

In a typical radar tracking system for use in a guided missile a target is tracked by means of a multi-element aerial, producing a plurality of RF outputs. These outputs may typically be added and subtracted to produce a sum signal and at least one difference signal, which signals are processed in a multi-channel receiver, and the resulting IF outputs are then compared in amplitude and/or phase so as to produce at least one receiver output signal, representing the orientation of the target relative to the aerial boresight. This receiver output signal is then utilized to navigate the missile so that it follows a course which will intercept the target.

The aerial is usually mounted on a mechanical arrangement for movement about two mutually perpendicular axes, such that whatever the direction of the intercept course to the target and the orientation of the missile body relative to this vector, the aerial boresight can be moved to 'point at' the target, i.e. the aerial can be moved to track the target. Electric motors are provided to drive the aerial system and are energized by the receiver output signal in a manner such that when the aerial boresight is pointing at the target the receiver output signal is zero.

The missile is maintained on the correct intercept course by measuring the angular movement in space of the sight line between the missile and the target and by controlling the motion of the missile normal to this sight line in negative proportion to this angular movement in space. The sight line angle rate is measured by one or more gyroscopes mounted for movement with the aerial, these gyroscopes providing a space reference. Since the aerial boresight lies along the missile-target sight line, the gyroscope outputs are proportional to the angular movement of the sight line in space.

If the missile body changes its attitude in space, and there is friction or other drag effect associated with the aerial system, then the motion of the missile body will tend to drag the aerial with it, i.e. move the aerial off the missile to target line of sight. When this happens the missile guidance system registers an apparent movement of the target which has not in fact taken place, and provides an output which alters the missile acceleration in an erroneous manner so that target interception will not take place.

To overcome this difficulty it is usual to provide a space stabilization loop as well as a target angle tracking loop. In the space stabilization loop the output of the gyroscopes is not only used as the output signal of the homing head, but is also used to energize the motors driving the aerial system in a manner such that its motion counteracts the missile body motion, i.e. the aerial maintains its attitude in space and continues to point along the missile to target line of sight. If a very high gain could be achieved in the space stabilization loop, then the errors which arise can be made negligible and hence correct missile guidance could be obtained even if the missile body moves in space relative to the missile-to-target line of sight.

However, the necessary high gain in the space stabilization loops requires very powerful and wide bandwidth motors to drive the aerial system and this is detrimental to the design of small and inexpensive homing heads. The missile axis rotation may be as high as 1000 degrees/second and the desired resolution of missile-to-target sight line in space is only 0.01 degrees/second, i.e. 100,000:1 ratio to be maintained over a bandwidth of several Hz. For small missiles it is not feasible to include motors having adequate power within the space and cost limitations and therefore spurious guidance signals will occur due to imperfections in the space stabilization loop.

An object of the present invention is to provide a missile guidance system in which the above drawbacks are reduced or eliminated.

According to one aspect of the present invention a missile guidance system includes means for deriving from a target angle tracking loop a signal indicative of an apparent movement of a target off a missile-to-target sight line caused by a change in missile attitude, and means for feeding said apparent movement signal into a space stabilization loop to adjust the position of the aerial to compensate for the said apparent movement.

With a radar tracking system it is important that when the multi-element aerial is receiving a signal from a target, the aerial should be kept in alignment with the target regardless of the attitude in space of a missile on which the aerial is mounted.

The invention will now be described, by way of example, with reference to the accompanying drawings in which:

FIG. 1 is a schematic front elevation of a multi-element aerial of a missile guidance system in accordance with the invention;

FIG. 4 is a block schematic circuit diagram of the relevant parts of a missile guidance system in accordance with the invention.

FIG. 5 is a block schematic circuit diagram of a semi-active radar system of a guided missile homing head provided with a controlled automatic gain control system in accordance with the invention;

FIG. 6 shows certain waveforms which will be used to explain the operation of controlled automatic gain control system in accordance with the invention; and FIG. 7 is a graph indicating the control characteristics of the controlled automatic gain control system used in the circuit of FIG. 5.

Figure 2:
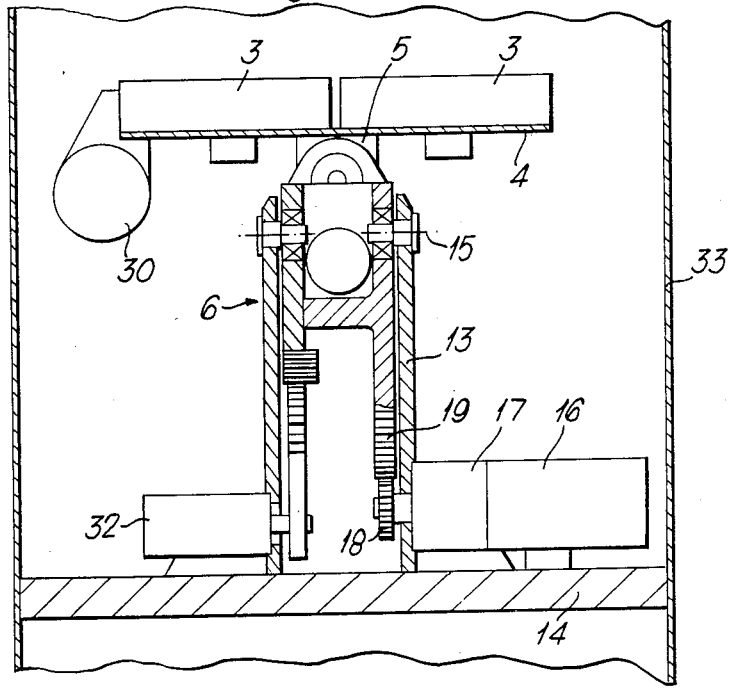
FIG. 2 is a cross-section taken on the line II—II in FIG. 1.
Figure 3:
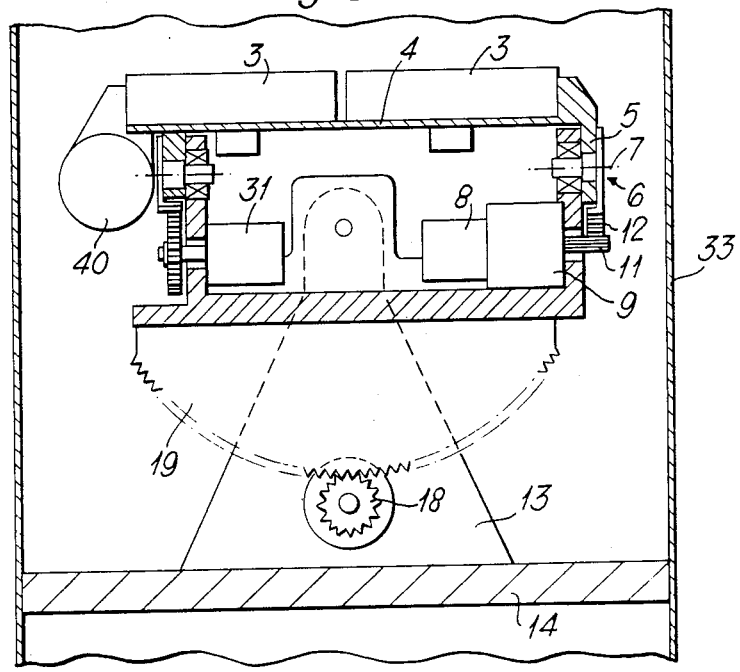
FIG. 3 is a cross-section taken on the line III—III in FIG. 1.

The aerial mounting arrangement to be described is part of a homing head for an air-to-air missile. The radar system is a semi-active one, in which the target is illuminated with radio waves from a source remote from the missile, e.g. from the radar of the aircraft which launched the missile.

Referring first to FIG. 1, the multi-element aerial 1 comprises an array of four aerial elements 1a to 1d each of which has its own feed antenna 2 and reflector dish 3. The axes of the four elements 1a to 1d are all parallel to each other, so that when a radio signal is received from a target by the aerial, the resulting output signals from the four elements are all of substantially equal amplitude, but differ in phase, according to the orientation of the target relative to the aerial.

The platform 4 carries a pair of stabilization gyros 30 and 40 arranged to provide output signals indicative of the movements of the platform 4 and aerial 1 in space, while the mounting assembly 6 carries two potentiometers 31 and 32 respectively driven by the gear trains 9 and 17 and arranged to provide electrical outputs indicative of the movements in azimuth and elevation imparted to the platform 4 and aerial 1 by the respective gear train 9 and 17.

Referring now to FIG. 4, an angle tracking loop for control in the azimuth axis comprises a subtractor 42, a receiver 43, a subtractor 44, a radar filter 45, a subtractor circuit 46, an integrating filter 47, the D.C. drive motor 8 and a summing circuit 49. A space stabilization loop for control in the azimuth axis comprises the integrating filter 47, the D.C. drive motor 8, the summing circuit 49, the rate gyroscope 30 and the subtractor circuit 46. A compensating circuit 51 is arranged to derive from the angle tracking loop a signal indicative of the apparent movement of the target off the missile to target sight line caused by a change in missile attitude in azimuth and to feed it into the space stabilization loop by way of the subtractor circuit 44 and the radar filter 45.

A similar angle tracking loop for control in the elevation axis comprises a subtractor circuit 52, a receiver 53, a further subtractor 54, a radar filter 55, a subtractor circuit 56, an integrating filter 57, the D.C. drive motor 16 and a summing circuit 59. A space stabilization loop for control in the elevation axis comprises the integrating filter 57, the D.C. drive motor 16, the summing circuit 59, the rate gyroscope 40 and the subtractor circuit 56. A compensating circuit 61 is arranged to derive from the angle tracking loop a signal indicative of the apparent movement of the target off the missile to target sight line caused by a change in missile attitude in elevation and to feed it into the space stabilization loop by way of the subtractor circuit 54 and the radar filter 55.

The two circuit arrangements one for compensation in azimuth and the other for compensation in elevation function in the same way and therefore the operation of the azimuth arrangement only will be described. The subtractor circuit 42 has an input lead 62 into which is fed a signal indicative of the apparent line of sight angle. The subtractor 42 also receives on an input lead 63 a signal indicative of the orientation of the aerial in space and produces an output signal indicative of the "eye pointing error" or angular movement in space of the sight line between the missile and the target, and feeds this output signal to the receiver 43. The receiver 43 produces a voltage signal proportional to the eye pointing error and applies this voltage to the radar filter 45 by way of the subtractor circuit 44.

The output signal from the space stabilization loop, which includes the resultant of signals from the rate gyroscope 30 and a signal indicative of the body angle in space applied to an input lead 65 of the summing circuit 49, is applied by way of a lead 66 to the compensating circuit 51. The subtractor circuit 44 receives the output signal from the compensating circuit 51, as described above, and produces a difference output signal which is applied to the radar filter 45. The radar filter 45 provides an output signal $\theta_o$ on output lead 67 which is utilized to navigate the missile. The output signal $\theta_o$ from the radar filter 45 is also applied to the space stabilization loop to control the motor 8 and thus adjust the position of the aerial arrangement 1 in azimuth to compensate for apparent movement of the target off the missile to target sight line caused by a change in missile attitude in azimuth.

It can be shown that:

$$O_o = Y_2 [Y_1 (\psi_{SA} - \psi_D) - Y_C Y_F \epsilon]$$

$$\epsilon = \theta_o - Y_G \psi_D$$

$$\psi_D - \psi_M = Y_S Y_F \epsilon$$

i.e. $\theta_o = Y_1 Y_2 \psi_{SA} - Y_1 Y_2 \psi_D - Y_2 Y_C Y_F \epsilon$ $$\epsilon = \theta_o - Y_G \psi_D$$

$$\psi_D - \psi_M = Y_F Y_S \epsilon$$

(1) First eliminate $\epsilon$ $$\theta_o = Y_1 Y_2 \psi_{SA} - Y_1 Y_2 \psi_D - Y_2 Y_C Y_F \theta_o + Y_2 Y_C Y_F Y_G \psi_D$$

$$\psi_D - \psi_M = Y_F Y_S \theta_o - Y_F Y_S Y_G \psi_D$$

i.e. $(1 + Y_2 Y_C Y_F) \theta_o + (Y_1 Y_2 - Y_2 Y_C Y_F Y_G) \psi_D = Y_1 Y_2 \psi_{SA}$ $$Y_F Y_S \theta_o - (1 + Y_F Y_S Y_G) \psi_D + \psi_M = 0$$

(2) Eliminate $\psi_D$ $(1 + Y_2 Y_C Y_F + Y_F Y_S Y_G + Y_F Y_S Y_1 Y_2) \theta_o +$ $(Y_1 Y_2 - Y_2 Y_C Y_F Y_G) \psi_M = Y_1 Y_2 (1 + Y_F Y_S Y_G) \psi_{SA}$ i.e. $\left( \dfrac{1}{Y_2 Y_F Y_S Y_G} + \dfrac{Y_C}{Y_S Y_G} + \dfrac{1}{Y_2} + \dfrac{Y_1}{Y_G} \right) \theta_o +$ $\left( \dfrac{Y_1}{Y_F Y_S Y_G} - \dfrac{Y_C}{Y_S} \right) \psi_M = Y_1 \left( \dfrac{1}{Y_F Y_S Y_G} + 1 \right) \psi_{SA}$ i.e. $\dfrac{\theta_o}{\psi_{SA}} = \dfrac{Y_1 \left( 1 + \dfrac{1}{Y_F Y_S Y_G} \right)}{\left( \dfrac{1}{Y_2} + \dfrac{Y_1}{Y_G} + \dfrac{1}{Y_2 Y_F Y_S Y_G} + \dfrac{Y_C}{Y_S Y_G} \right) + \dfrac{\psi_M}{\theta_o} \left( \dfrac{Y_1}{Y_F Y_S Y_G} - \dfrac{Y_C}{Y_S} \right)}$ i.e. $\dfrac{(P\psi_S)H}{P\psi_{SA}} =$ $\dfrac{K_V Y_1 \left( 1 + \dfrac{1}{Y_F Y_S Y_G} \right)}{P \left( \dfrac{1}{Y_2} + \dfrac{Y_1}{Y_G} + \dfrac{1}{Y_2 Y_F Y_S Y_G} + \dfrac{Y_C}{Y_S Y_G} \right) + \dfrac{P \psi_M}{(P \psi_S) H} K_V \left( \dfrac{Y_1}{Y_F Y_S Y_G} - \dfrac{Y_C}{Y_S} \right)}$ Hence, ideally $$Y_C = \dfrac{Y_1}{Y_G Y_F}$$

for the last term to be zero. Also $$\dfrac{Y_C}{Y_S Y_G} \rightarrow \dfrac{Y_1}{Y_S Y_G Y_G Y_F}$$

and the numerator cancels, therefore $$\frac{(P_S)H}{P_{SA}} \cdot \frac{K_V Y_1}{P\left(\frac{1}{Y_2} + \frac{Y_1}{Y_G}\right)}$$

Where:
$Y_C$ is the transfer function of the compensating circuit 51
$Y_1$ is the output signal of the receiver 53
$Y_2$ is the signal from the radar filter 45
$Y_G$ is the signal from the rate gyroscope 30
$Y_F$ is the output signal of the integrating filter 4
$Y_S$ is the motor 8
K is output scaling.

In a modification of the missile guidance system shown in FIG. 4 the output signal from the compensating circuit 51 is fed to the input of the receiver 43, as indicated by the dotted line 68, instead of being applied to the subtractor circuit 44.

Referring now to FIG. 5, The four output signals from the multi-element aerial 1 which are designated $A_1$, $A_2$, $A_3$ and $A_4$, are added and subtracted in a circuit 72 to provide "sum" and "difference" signals which are passed to respective first intermediate frequency amplifiers 73 and 74 of a receiver 75. The receiver 75 comprises a local oscillator 76 the output of which is mixed with the outputs of the intermediate frequency amplifiers 73 and 74 in mixers 77 and 78 to convert them to a second intermediate frequency. These second intermediate frequency signals from the mixers 77 and 78 are passed to second intermediate frequency amplifiers 79 and 80.

The output from the intermediate frequency amplifier 80 is fed to an automatic gain control detector circuit 81 arranged to control the gain of the intermediate frequency amplifiers 73, 74, 79 and 80. The detector circuit 81 is also fed with a signal on an input lead 82 which is indicative of the power amplitude of the target return signal. This target return power amplitude signal is derived from the "sum" signal by way of a noise limiting filter 83 and is measured by a log amplifier 84 the output from which is passed through a function generator 85 arranged to cause the detector circuit 81 to control the speed of response of the automatic gain control in accordance with the waveforms shown in FIG. 6. In an alternative version, the gain of the intermediate frequency amplifiers 74 and 80 is sufficiently well defined, by using high stability components and design in them, that the output from the automatic gain control detector circuit 81 is a sufficiently accurate measure of sum channel input amplitude for this to be used instead of the signal on lead 81. The waveforms 87, 88 and 89 show the negative correlation between glint spikes and sum channel fluctuations which results in enhancement of the glint with fast automatic gain control and a small steady error. FIG. 7 illustrates the optimum control characteristics of the automatic gain control circuit 81 the response time of the automatic gain control in microseconds being plotted against the power amplitude of the target return signal.

We claim:

1. A missile guidance system comprising an aerial arrangement having a plurality of outputs, means for deriving from said aerial outputs a sum signal representative of the sum of the aerial outputs and a difference signal representative of the direction of a target relative to the aerial boresight, a target angle tracking loop including receiver means for deriving from said sum and difference signals a missile control output signal which is a function of the difference in angle between a line of sight from the missile to the target, as represented by said sum and difference signals, and the aerial boresight, the angle tracking loop further including aerial drive means for controlling the angular position of the aerial boresight, said aerial drive means being controlled by said output signal to tend to reduce said difference in angle to zero, the system further comprising a space stabilization loop including gyroscope means mounted on said aerial for providing an output signal representative of the rate of movement of the aerial in space, and also including said aerial drive means, gyroscope output signal being applied to said aerial drive means to stabilize the aerial boresight direction in space, and means for deriving from the angle tracking control signal applied to said aerial drive means a feedback signal that is a function of apparent movement of the target, said feedback signal being applied to said stabilization loop in opposition to said missile control output signal.

2. A missile guidance system according to claim 1, wherein said gyroscope output signal and said missile control output signals are subtracted and applied to said aerial drive means by way of integrating means to permit said aerial to track a target in the presence of an aerial stabilizing signal from said gyroscope means.

3. A missile guidance system according to claim 2, wherein said compensating signal is subtracted from the output of said receiver means to provide a said missile control output signal which is unresponsive to apparent target movement caused by changes in the missile attitude.

4. A missile guidance system according to claim 2, wherein said compensating signal is subtracted from the input of said receiver means to provide a said missile control output signal which is unresponsive to apparent target movement caused by changes in the missile attitude.

* * * * *